United States Patent
Schumann

(10) Patent No.: US 11,086,117 B2
(45) Date of Patent: Aug. 10, 2021

(54) APPARATUS AND METHOD FOR LIGHT-SHEET-LIKE ILLUMINATION OF A SAMPLE

(71) Applicant: LEICA MICROSYSTEMS CMS GMBH, Wetzlar (DE)

(72) Inventor: Christian Schumann, Lich (DE)

(73) Assignee: Leica Microsystems CMS GmbH, Wetzlar (DE)

(*) Notice: Subject to any disclaimer, the term of this patent is extended or adjusted under 35 U.S.C. 154(b) by 270 days.

(21) Appl. No.: 16/098,183

(22) PCT Filed: May 3, 2017

(86) PCT No.: PCT/EP2017/060545
§ 371 (c)(1),
(2) Date: Nov. 1, 2018

(87) PCT Pub. No.: WO2017/191193
PCT Pub. Date: Nov. 9, 2017

(65) Prior Publication Data
US 2019/0146202 A1 May 16, 2019

(30) Foreign Application Priority Data

May 4, 2016 (DE) ...................... 10 2016 108 384.4

(51) Int. Cl.
G02B 21/08 (2006.01)
G02B 21/16 (2006.01)
(Continued)

(52) U.S. Cl.
CPC ............. *G02B 21/08* (2013.01); *G02B 21/10* (2013.01); *G02B 21/16* (2013.01); *G02B 21/367* (2013.01);
(Continued)

(58) Field of Classification Search
CPC ...... G02B 21/08; G02B 21/10; G02B 21/367; G02B 27/0911; G02B 21/16;
(Continued)

(56) References Cited

U.S. PATENT DOCUMENTS 6,657,216 B1* 12/2003 Poris .................. G01B 11/0608
250/216
7,349,089 B1* 3/2008 Efimov ...................... G01J 3/02
356/368

(Continued)

FOREIGN PATENT DOCUMENTS

DE 3909621 A1 9/1990
DE 102004034957 A1 2/2006
(Continued)

OTHER PUBLICATIONS

Mahou Pierre et al: "Multiphoton light-sheet microscopy using wavelength mixing: fast multicolor imaging of the beating Zebrafish heart with los photobleaching", Progess in Biomedical Optics and Imaging, SPIE—International Society for Optical Engineering, Bellingham, WA, US, Bd. 9329, Mar. 3, 2015 (Mar. 3, 2015), pp. 93290Z-93290Z, XP060049197.

*Primary Examiner* — Stephone B Allen
*Assistant Examiner* — Rahman Abdur
(74) *Attorney, Agent, or Firm* — Leydig, Voit & Mayer, Ltd.

(57) ABSTRACT

An apparatus for light-sheet-like light illumination of a sample includes a light source configured to generate an illumination beam. A focusing system is configured to focus the illumination beam to form a light-sheet-like illumination light distribution, with which a focal plane of the sample can be illuminated. An imaging optical unit is configured to image the light-sheet-like illumination light distribution into the focal plane. A polarization element, arranged in a position conjugated to the focal plane between the focusing (Continued)

system and the imaging optical unit, is configured to split the illumination beam into two differently polarized sub-beams, which propagate into the imaging optical unit in different propagation directions, whereby the light-sheet-like illumination light distribution can be imaged by the imaging optical unit in the form of two differently polarized light-sheets, which from a same side of the focal plane are superimposed on each other in the focal plane.

14 Claims, 3 Drawing Sheets

(51) Int. Cl.
  *G02B 27/28* (2006.01)
  *G02B 21/10* (2006.01)
  *G02B 21/36* (2006.01)
  *G02B 27/09* (2006.01)

(52) U.S. Cl.
  CPC ........ *G02B 27/0911* (2013.01); *G02B 27/283* (2013.01)

(58) Field of Classification Search
  CPC ...... G02B 27/283; G02B 21/14; G02B 21/06; G02B 21/0036; G02B 21/008; G02B 21/125; G02B 23/2461; G02B 26/02; G02B 26/08
  USPC .................................................. 359/385, 386
  See application file for complete search history.

(56) References Cited

U.S. PATENT DOCUMENTS

| | | | |
|---|---|---|---|
| 7,787,179 B2 | 8/2010 | Lippert et al. | |
| 8,582,203 B2 | 11/2013 | Dunsby | |
| 8,792,162 B2 | 7/2014 | Lippert et al. | |
| 8,970,950 B2 | 3/2015 | Stelzer | |
| 9,195,041 B2* | 11/2015 | Redford | G02B 27/0068 |
| 10,024,793 B2 | 7/2018 | Ritter et al. | |
| 2006/0012866 A1 | 1/2006 | Wolleschensky | |
| 2012/0105949 A1* | 5/2012 | Cummings | G02B 21/0008 |
| | | | 359/385 |
| 2012/0133937 A1* | 5/2012 | Heintzmann | G01N 21/6458 |
| | | | 356/364 |
| 2014/0330097 A1* | 11/2014 | Weiss | A61B 5/1455 |
| | | | 600/316 |
| 2015/0029325 A1 | 1/2015 | Dholakia et al. | |
| 2015/0098126 A1* | 4/2015 | Keller | G02B 21/0076 |
| | | | 359/385 |
| 2015/0192767 A1* | 7/2015 | Li | G02B 21/18 |
| | | | 348/79 |
| 2015/0205087 A1 | 7/2015 | Schumann | |
| 2015/0323774 A1* | 11/2015 | Lippert | G02B 21/002 |
| | | | 359/388 |

FOREIGN PATENT DOCUMENTS

| | | | | |
|---|---|---|---|---|
| DE | 102012214568 A1 * | 2/2014 | | G02B 21/18 |
| DE | 102012214568 A1 | 2/2014 | | |
| DE | 102013208926 A1 | 11/2014 | | |
| DE | 102014116174 A1 | 5/2016 | | |

* cited by examiner

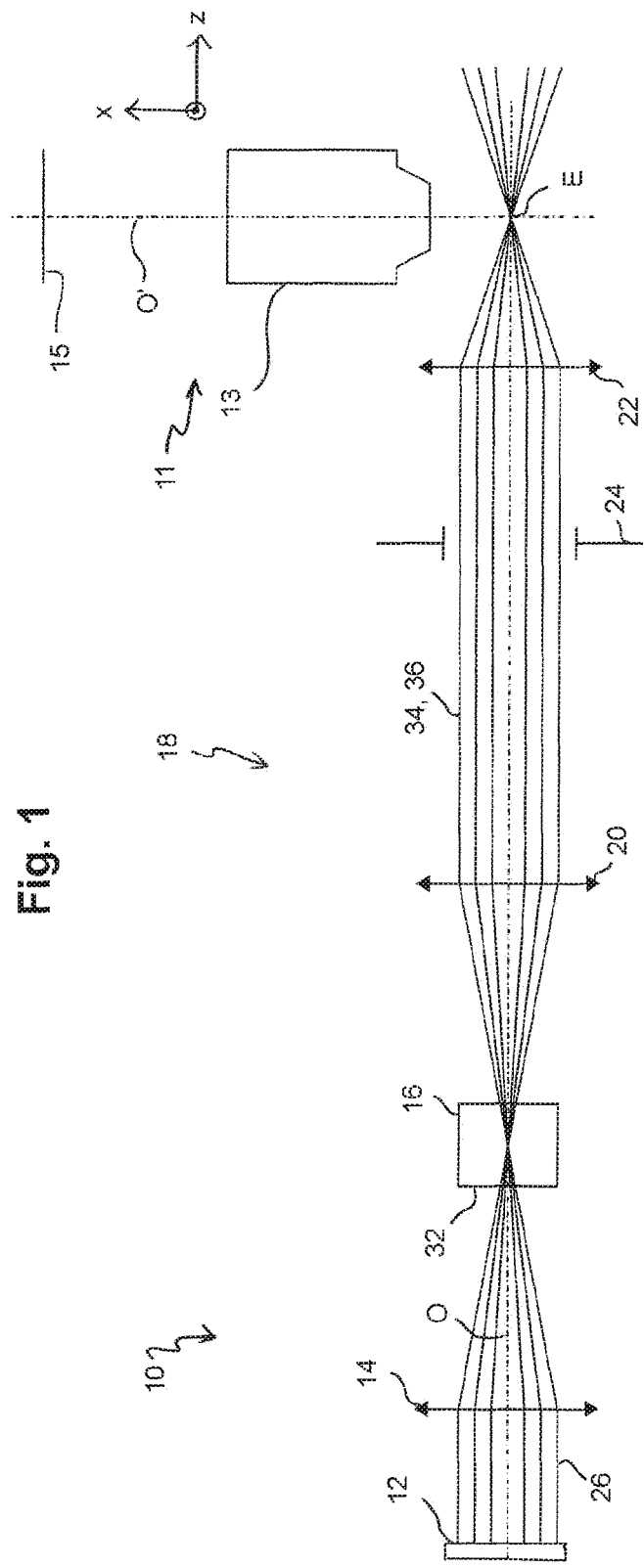
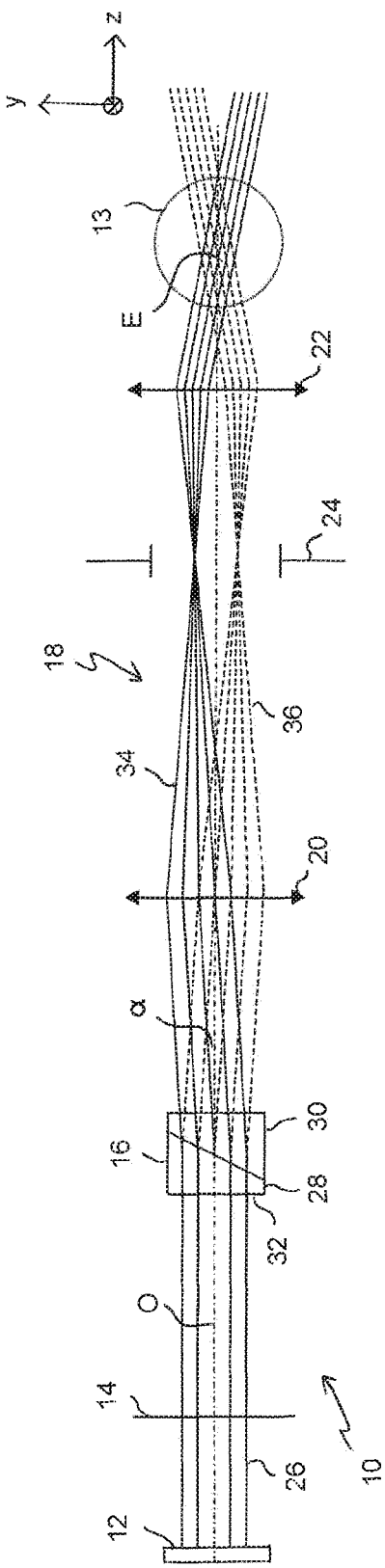

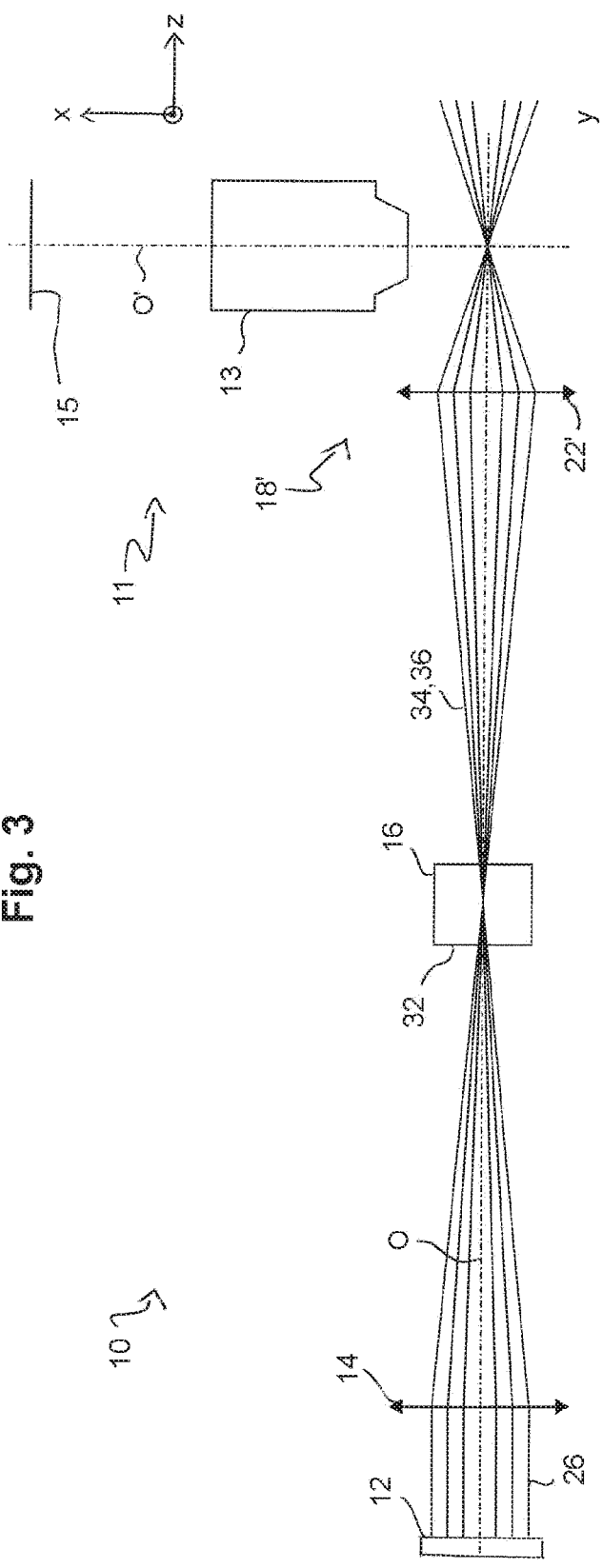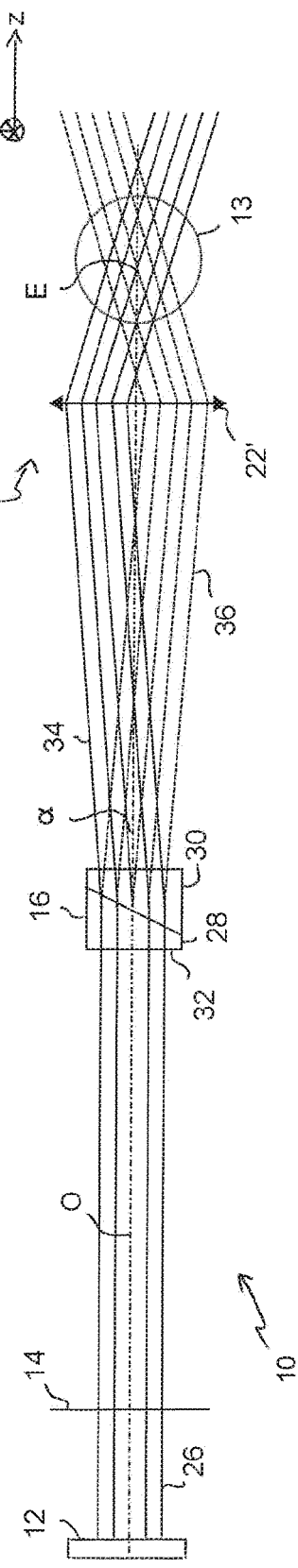

APPARATUS AND METHOD FOR LIGHT-SHEET-LIKE ILLUMINATION OF A SAMPLE

CROSS-REFERENCE TO PRIOR APPLICATIONS

This application is a U.S. National Stage Application under 35 U.S.C. § 371 of International Application No. PCT/EP2017/060545 filed on May 3, 2017, and claims benefit to German Patent Application No. DE 10 2016 108 384.4 filed on May 4, 2016. The International Application was published in German on Nov. 9, 2017, as WO 2017/191193 A1 under PCT Article 21(2).

FIELD

The invention relates to an apparatus for light-sheet-like illumination of a sample, comprising a light source for generating an illumination beam and a focusing system for focusing the illumination light beam to form a light-sheet-like illumination light distribution, with which a focal plane of the sample can be illuminated. Further, the invention relates to a method for light-sheet-like illumination of a sample.

BACKGROUND

In so-called light-sheet- or light-sheet fluorescence microscopy, a sample is illuminated with a light-sheet, via an illumination objective, of which the optical axis is perpendicular to the optical axis of the detection optical unit. When the focal plane, in which the sample is illuminated with the light-sheet, is successively moved along the optical axis of the detection optical unit, a three-dimensional imaging is possible. An advantage of this method, which is used in wide-field fluorescence microscopy, is, in particular, a particularly low light exposure of the sample.

However, a problem is that the illumination light propagates perpendicular to the optical axis of the detection optical unit. Thus, it may result, by means of scattering centers or absorbers within the sample, in the scattering or absorption of the illumination light, which is noticeable in the resulting image in the form of streak artifacts in the propagation direction of the illumination light.

In order to reduce such artifacts, various methods are known in the prior art. For example, in U.S. Pat. No. 8,792,162 B2, two separate illumination beam paths are proposed, by means of which the sample is illuminated from both sides. The proposed two-sided illumination of the sample has the obvious disadvantage that two separate illumination apparatuses are to be provided, which are also to be adjusted precisely with respect to each other. This is technically and economically costly. Moreover, this solution cannot be used in some selective plane illumination microscopy (SPIM) techniques, such as so-called oblique plane microscopy, abbreviated to OPM (oblique plane microscopy). An example of an oblique plane microscope is found in U.S. Pat. No. 8,582,203 B2.

In the publication U.S. Pat. No. 7,787,179 B2, the use of an adjustable deflection element is proposed for sequentially generating various incidence-directions of the illumination light-sheet. The deflection element must be designed to achieve an adequate speed, for example, as a galvanometer, and is accordingly expensive. Furthermore, the movement of the deflection element must be synchronized with the frame rate of the detection, in order to avoid additional brightness artifacts. Furthermore, the speed of the deflector element is limited to the maximum frame rate of the overall system.

The document U.S. Pat. No. 7,787,179 B2 further provides the use of a cylindrical lens array as well as a light source with low spatial coherence for generating a plurality of laterally offset light-sheets. The use, proposed here, of a light source with low spatial coherence, in order to avoid interference artifacts between the individual sub-beams along the long lateral axis of the light-sheet, reduces the quality of the light-sheet along the short lateral axis, since the coherence is also reduced here, and thus no diffraction-limited focusing is possible.

Further, in DE 10 2004 034 957 A1 and DE 10 2012 214 568 A1, illumination systems for SPIM illumination are disclosed, which can each have birefringent light splitting, wherein the sub-beams thus generated propagate in opposite illumination directions. The opposite illumination directions make it necessary that the sample volume can be reached from three directions. Two of these directions are opposite to each other, while the third direction is orthogonal thereto.

SUMMARY

In an embodiment, the present invention provides an apparatus for light-sheet-like light illumination of a sample. A light source is configured to generate an illumination beam. A focusing system is configured to focus the illumination beam to form a light-sheet-like illumination light distribution, with which a focal plane of the sample can be illuminated. An imaging optical unit is configured to image the light-sheet-like illumination light distribution into the focal plane of the sample. A polarization element is arranged in a position conjugated to the focal plane between the focusing system and the imaging optical unit and is configured to split the illumination beam into two differently polarized sub-beams, which propagate into the imaging optical unit in different propagation directions, whereby the light-sheet-like illumination light distribution can be imaged by the imaging optical unit in the form of two differently polarized light-sheets, which from a same side of the focal plane are superimposed on each other in the focal plane.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 shows a schematic sectional view of an illumination apparatus according to the invention as a first embodiment;

FIG. 2 shows a further sectional view of the illumination apparatus according to the first embodiment;

FIG. 3 shows a schematic sectional view of an illumination apparatus according to the invention as a second embodiment; and FIG. 4 shows another sectional view of the illumination apparatus according to the second embodiment.

DETAILED DESCRIPTION

Figure 5:
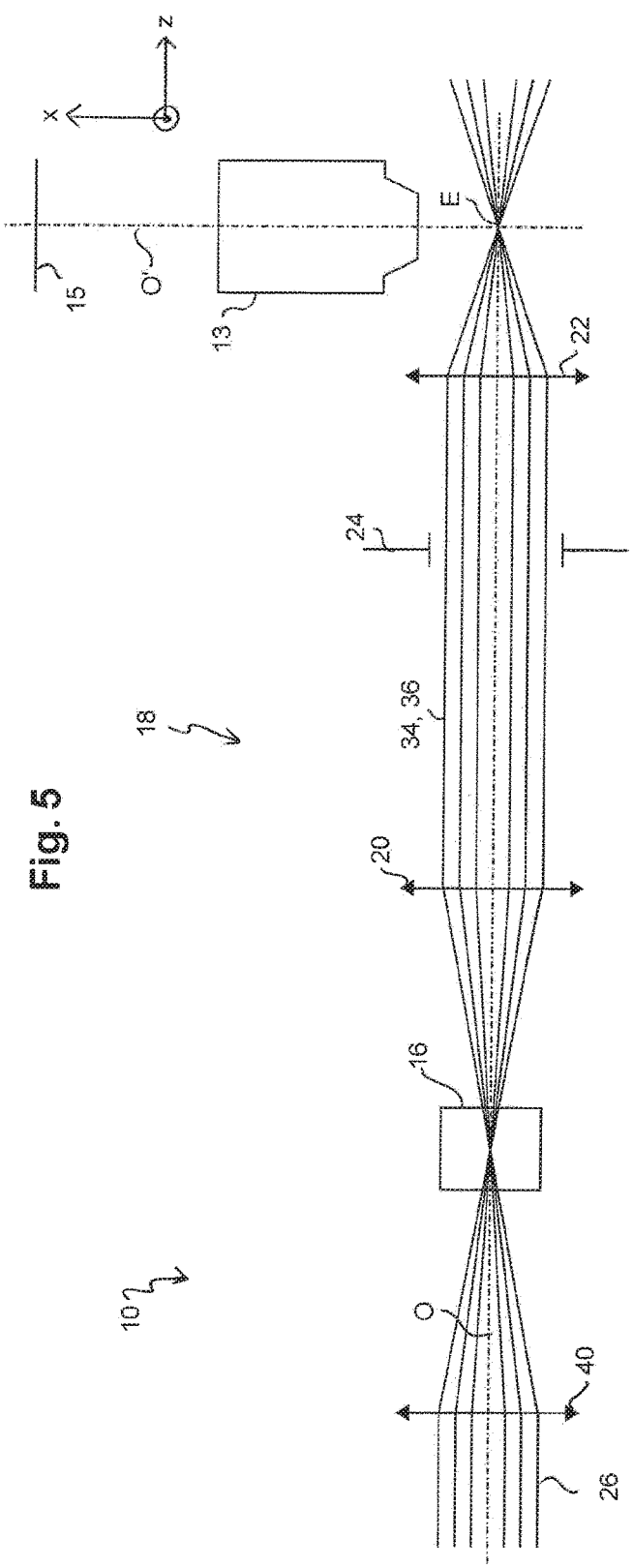
FIG. 5 shows another sectional view of the illumination apparatus according to the invention as a third embodiment.

Embodiments of the invention provide an apparatus and a method for light-sheet-like illumination of a sample, with which, while avoiding the above-described disadvantages of conventional systems, the occurrence of streak artifacts, which are caused by the shadows of the illumination light within the sample during selective illumination of the focal plane by means of a light-sheet, can be largely prevented.

The apparatus according to an embodiment of the invention provides a light source for generating an illumination light beam and a focusing system for focusing the illumination light beam to form a light-sheet-like illumination light distribution, with which a focal plane of the sample can be illuminated. According to an embodiment of the invention, an imaging optical unit is further provided, which images the light-sheet-like illumination light distribution into the focal plane of the sample. Between the focusing system and the imaging optical unit, a polarization element is arranged, which splits the illuminating light beam into two differently polarized sub-beams, which propagate into the imaging optical unit in different propagation directions, whereby the light-sheet-like illumination light distribution can be imaged by the imaging optical unit in the form of two differently polarized light-sheets, which are superimposed on each other in the focal plane.

Since, in the single illumination beam path of the illumination apparatus according to the invention, the two sub-beams generated by the polarization element propagate into the imaging optical unit at various angles to the optical axis of the illumination beam path, two light-sheets are generated in the sample, which illuminate the viewed focal plane from different directions. Now, shading of the illumination light takes place in one of the two illumination directions, due to a scattering center or an absorber, and thus a still sufficient illumination of the focal plane is ensured by the other illumination direction, which is undisturbed by the scattering center or the absorber. As a result, the streak artifacts can be reliably avoided.

The apparatus according to an embodiment of the invention allows, in particular, the coupling of illumination light into a SPIM system that has a single illumination objective. Thus, the realization of the invention according to an embodiment is technically less complex than conventional systems in which various polarized sub-beams propagate into the sample in opposite illumination directions and therefore require two separate illumination objectives.

The apparatus according to the invention can particularly preferably be used in a conventional SPIM system, in which a separate detection objective is provided in addition to an illumination objective. However, the invention is not limited to this use. For example, it can also be used in oblique plane microscopy, in which a single objective is used for illumination and for detection.

Preferably, the polarization element is arranged in a position conjugated to the focal plane.

This conjugated position lies, for example, at the position of the light-sheet primarily generated by the focusing system.

In an advantageous embodiment, the polarization element is formed in order to deflect the two sub-beams at opposite equal angles from the optical axis of the illumination apparatus. If one denotes the above-mentioned angle with a and the magnification caused by the imaging optical unit with ß, in this embodiment, two light-sheets are generated in the sample, which propagate at an angle ±α/ß to the optical axis of the illumination apparatus within the sample. The angle 2α>0, which the two propagation directions have to each other, reduces streaking caused by scattering and absorption.

Preferably, the polarization element is formed, so that the two sub-beams are linearly polarized, wherein their polarization directions are perpendicular to each other. The mutually perpendicular polarization directions have the advantage that interference between the two light-sheets is excluded. In addition, by illumination from these two polarization directions, photo-selection effects in the excitation of fluorophores are reduced.

In a particularly preferred embodiment, the polarization element is a Wollaston prism. Such a prism consists of, for example, two rectangular Calcite prisms, which are cemented together at their base surfaces. The optical axes of the two prisms are perpendicular to each other.

Preferably, the focusing system comprises an anamorphic optical element, for example a cylindrical lens. With such a cylindrical lens, which focuses the illumination light beam only in one direction, the light-sheet-like illumination light distribution, required for the desired selective illumination of the focal plane, can be generated in a particularly simple manner. For this purpose, the anamorphic element can focus either in a plane conjugated to the object or in a plane conjugated to the pupil. In the first form, the polarization element is advantageously arranged in a plane conjugated to the front focal plane of the anamorphically optical element, and in the latter form, in a plane conjugated to the rear focal plane of the anamorphic optical element. Also, these embodiments are only to be understood as examples. Other realizations are also conceivable, e.g., in the form of a Powell lens or the like.

In another alternative embodiment, the focusing system comprises a scanning device and a cylindrically symmetrical optical unit. The scanning device is, for example, a scanning mirror that is tiltable about an axis, such as a galvanometer mirror or a mirror based on a micro-electromechanical system, abbreviated to MEMS-mirror, which deflects the illumination beam as a result of the tilting of said mirror within a plane in such a way that the illumination beam practically creates a light-sheet in said plane. The cylindrically symmetrical optical unit is, e.g., an f-theta lens, or an f-tan theta lens. A specific realization of such a focusing system is described, for example, in U.S. Pat. No. 8,970,950 B2.

Preferably, the plane in which the polarization element (16) splits the illumination light beam into the two sub-beams is perpendicular to the focusing direction of the anamorphic optical system or perpendicular to the scanning direction of the scanning device, wherein the focusing or the scanning direction is advantageously perpendicular to the optical axis of the illumination apparatus.

In a further preferred embodiment, the illumination light beam is linearly polarized. However, the invention is not limited to such an embodiment. The illumination light beam can also be unpolarized, for example. Also, the use of circularly or elliptically polarized illumination light is possible.

If the illumination light beam is linearly polarized, its polarization direction preferably has an angle of 45° with respect to the splitting direction of the polarization element. This allows a particularly simple realization of the illumination apparatus according to the invention.

In a particularly preferred embodiment, the imaging optical unit comprises an objective, which is the only illumination objective. Thus, the invention can be used particularly advantageously in a conventional SPIM microscope, which has a single illumination objective as well as a separate detection objective.

In a specific embodiment, the imaging optical unit comprises an infinity objective and a tube lens. This substantially two-piece design of the imaging optical unit has the advantage that, if necessary or helpful, further optical components can be coupled in a particularly simple way to the infinite beam path adjoining the objective. This design also allows a particular modularity of the system in that the widely commercially available portfolios of infinity objectives can be used.

In an alternative embodiment, the imaging optical unit comprises a finite objective. Thus, a particularly compact and easily realizable one-piece embodiment of the magnification system is possible.

An embodiment of the invention further provides a method for the light-sheet-like illumination of a sample, in which an illumination beam is generated and the illumination beam is focused to form a light-sheet-like illumination light distribution, with which a focal plane of the sample can be illuminated, wherein the light-sheet-like illumination light distribution is imaged into the focal plane of the sample, and the illumination beam is split into two differently polarized sub-beams, which propagate into the imaging optical unit in different propagation directions, and the light-sheet-like illumination light distribution is imaged by the imaging optical unit in the form of two differently polarized light-sheets, which are superimposed on each other in the focal plane.

Preferably, the method according to the invention can be used in a SPIM microscope or an oblique plane microscope.

FIGS. 1 and 2 show sectional views of an illumination apparatus 10, which, is for example, part of a SPIM microscope. The SPIM microscope contains a detection unit 11, shown only schematically in FIGS. 1 and 2, with a detection optical unit 13 and a detector 15. The optical axis O' of the detection optical unit 13 is arranged perpendicular to the optical axis O of the illumination apparatus 10. In FIGS. 1 and 2, reference is made in each case to a rectangular coordinate system x-y-z, the z-axis of which coincides with the optical axis O. Accordingly, the illumination apparatus 10 is shown in FIG. 1 in a x-z section and in FIG. 2 in a y-z section. The illustrations in FIGS. 1 and 2 are simplified and purely schematic. For instance, only those components which are required for understanding the invention are shown.

The illumination apparatus 10 comprises a light source 12, an anamorphic focusing system 14 in the form of a cylindrical lens, a Wollaston prism 16 and an imaging optical unit 18, which is formed of a tube lens 20 and an infinity objective 22. The entrance pupil of the infinitive objective 22, designated by 24, is located between the infinity objective 22 and the tube lens 20.

The light source 12 emits a collimated illumination light beam 26 to the cylindrical lens 14. The cylindrical lens 14 has the property that it focuses the illumination light beam 26 only in a direction parallel to the x-axis, while it has no optical effect on the illumination light beam 26 in a direction parallel to the y-axis. Thus, the cylindrical lens 14 generates a light-sheet-like illumination light distribution in the region of its focal plane, which distribution is focused in the direction of the x-axis and extended flat in the direction of the y-axis. This illumination light distribution is imaged by the imaging optical unit 18 into a focal plane designated by E in the figures.

The Wollaston prism 16 is located on the optical axis O at the position at which the cylindrical lens 14 focuses the illumination light beam 26 to the light-sheet-like illuminating light distribution. As shown in the sectional view according to FIG. 2, the Wollaston prism 16 is composed of two rectangular prisms, e.g. Calcite prisms 28, 30, which are cemented together at their base surfaces. The optical axes of the two prisms 28, 30 are perpendicular to each other.

The Wollaston prism 16 is arranged in the beam path of the illumination apparatus 10, such that its entrance surface 32 is aligned perpendicular to the optical axis O. The illumination light beam 26 striking the entrance surface 32, is split by the Wollaston prism 16 into two sub-beams 34, 36, which each have a different polarization. In this case, the plane in which the Wollaston prism 16 splits the illumination beam into two sub-beams 34, 36, is parallel to the y-axis, i.e. in the section according to FIG. 2 in the drawing plane, and in the section according to FIG. 1, perpendicular to the drawing plane. The splitting plane of the Wollaston prism thus extends perpendicular to the focusing direction of the cylindrical lens 14. In the illustration of FIG. 2, the sub-beam 34 shown by solid lines is intended to be p-polarized, purely as an example, and the sub-beam 36 shown by dashed lines is intended to be s-polarized. Furthermore, it is assumed in the exemplary embodiment illustrated in FIGS. 1 and 2 that the illumination light beam 26 entering the Wollaston prism 16 is, in turn, linearly polarized, wherein the polarization direction of the illumination light beam 26 is perpendicular to the optical axis O, and has an angle of 45° with respect to the splitting direction of the Wollaston prism 16. This linear polarization of the illumination light beam 26 is in turn to be understood purely as an example. For example, it is also possible for the illumination light to be unpolarized, circularly polarized, or elliptically polarized.

The Wollaston prism 16 breaks up the illumination light bundle 26 in such a way that the two sub-beams 34 and 36, in the sectional view according to FIG. 2, are deflected at opposite equal angles from the optical axis O. The relevant angle is designated by α in FIG. 2. The angle α is chosen, such that it is within the acceptance range of the imaging optical unit 18.

Thus, it is ensured that the two sub-beams 34, 36 reach, in any case, into the imaging optical unit 18. In this way, the imaging optical unit 18, which images the light-sheet-like illumination light distribution generated by the cylindrical lens 14 at the location of the Wollaston prism 16 into the focal plane E, generates two separate light-sheets, of which the light-sheet associated with the sub-beam 34 is p-polarized and the light-sheet associated with the sub-beam 36 is s-polarized, in the focal plane E. As shown in FIG. 2, the two light-sheets are superimposed on each other in the region of the focal plane E.

Assuming that the imaging optical unit 18 has a magnification ß, the two mutually perpendicularly polarized light-sheets propagate in the sample at an angle ±α/ß with respect to the optical axis O. By means of these two different propagation directions, streak artifacts resulting from scattering centers or absorbers present in the sample are largely avoided. If scattering and/or absorption occurs, for example, specifically in the propagation direction of the sub-beam 34, another, undisturbed propagation direction is available, together with the other sub-beam 36, for the illumination of the focal plane E, by means of which the streaking is reduced.

FIGS. 3 and 4 are sectional views corresponding to FIGS. 1 and 2 respectively and show a second embodiment, which has an imaging optical unit 18' that is modified with respect to the embodiment shown in FIGS. 1 and 2. Whereas the imaging optical unit 18 of the first embodiment is substantially formed of two parts, with the tube lens 20 and the downstream infinity objective 22, the imaging optical unit 18' of the second embodiment has a one-piece design. For example, the imaging optical unit 18' is formed only of a finite objective 22. Thus, it does not require a tube lens.

Furthermore, the design of the second embodiment corresponds to that of the first embodiment. For this purpose, reference is made to the description of FIGS. 1 and 2.

Figure 6:
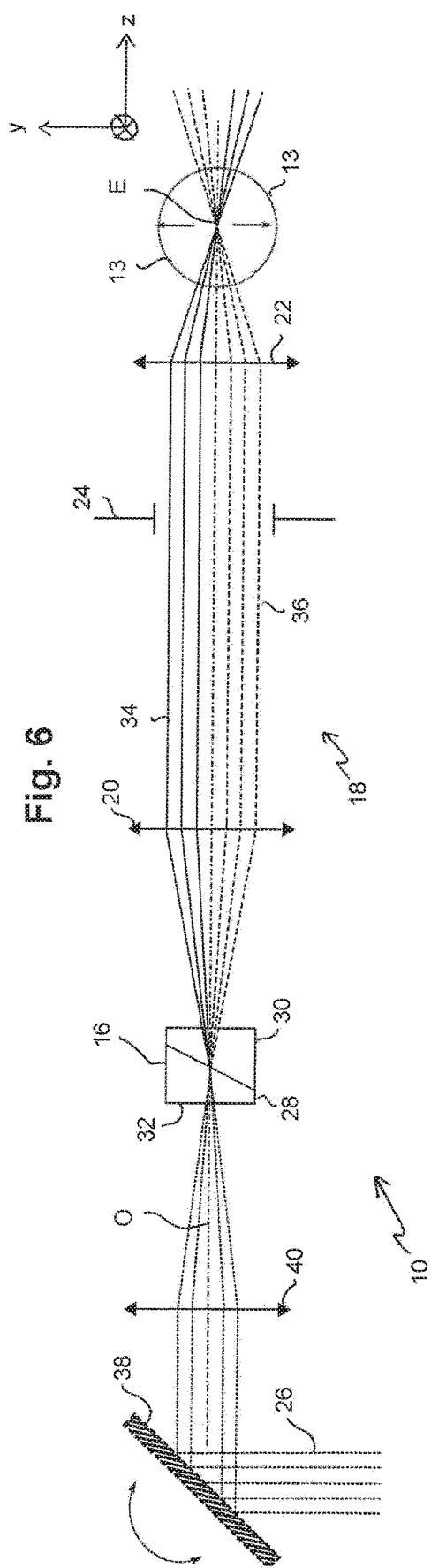
FIG. 6 shows another sectional view of the illumination apparatus according to the third embodiment.

FIGS. 5 and 6 are sectional views corresponding to FIGS. 1 and 2 respectively, and show a third embodiment, in which instead of the cylinder lens 14, a focusing system is provided which is formed of a scanning mirror 38 and a cylindrically symmetrical optical unit 40. The scanning mirror 38 is shown only in FIG. 6. Furthermore, in the illustrations according to FIGS. 5 and 6, the light source 12 is not shown for simplicity.

As shown in FIG. 6, the scanning mirror 38, which is designed, for example, as a galvanometer mirror or MEMS mirror, is tiltable about an axis parallel to the x-axis. As a result of this tilting, the illumination beam 26 reflected on the scanning mirror 38 performs a scanning motion in the y-z plane. In cooperation with the cylindrically symmetrical optical unit 40, which can be e.g. an f-theta lens or an f-tan theta lens, a light-sheet-like illumination light distribution is thereby generated in the y-z plane and, moreover, is used in the same manner as in the two first embodiments, in order to generate two mutually tilted light-sheets of different polarization, which are superimposed on each other in the focal plane E.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

10 Illumination apparatus
11 Detection unit
12 Light source
13 Detection optical unit
14 Cylindrical lens
15 Detector
16 Wollaston prism
18 Imaging optical unit
20 Tube lens
22 Infinity objective
22' Finite objective
24 Pupil of the infinity objective 22
26 Illumination light beam
28, 30 Rectangular prisms
32 Entrance surface
34, 36 Sub-beams
38 Scanning direction
40 Cylindrically symmetrical optical unit
O Optical axis
O' Optical axis
E Focal plane
α Angle
x, y, z Axes

The invention claimed is:

1. An apparatus for light-sheet-like light illumination of a sample, comprising:
   a light source configured to generate an illumination beam; and
   a focusing system configured to focus the illumination beam to form a light-sheet-like illumination light distribution, with which a focal plane of the sample can be illuminated;
   an imaging optical unit configured to image the light-sheet-like illumination light distribution into the focal plane of the sample; and
   a splitter device embodied as a polarization element arranged in a position conjugated to the focal plane between the focusing system and the imaging optical unit and configured to split the light-sheet-like illumination light distribution received from the focusing system into two differently polarized sub-beams, which propagate into the imaging optical unit in different propagation directions, whereby the light-sheet-like illumination light distribution can be imaged by the imaging optical unit in the form of two differently polarized light-sheets, which from a same side of the focal plane are superimposed on each other in the focal plane.

2. The apparatus according to claim 1, wherein the polarization element is configured to deflect the two sub-beams at opposite equal angles from the optical axis of the apparatus.

3. The apparatus according to claim 1, wherein the two sub-beams are linearly polarized with polarizing directions that are perpendicular to each other.

4. The apparatus according to claim 1, wherein the polarization element is a Wollaston prism.

5. The apparatus according to claim 1, wherein the focusing system comprises an anamorphic optical element.

6. The apparatus according to claim 5, wherein a plane in which the polarization element splits the illumination beam into the two sub-beams is perpendicular to a focusing direction of the anamorphic optical element or perpendicular to a scanning direction of the scanning system.

7. The apparatus according to claim 6, wherein the illumination beam is linearly polarized.

8. The apparatus according to claim 7, wherein a polarization direction of the linearly polarized illumination beam has an angle of 45° with respect to a splitting direction of the polarization element.

9. The apparatus according to claim 1, wherein the focusing system comprises a scanning device and a cylindrically symmetrical optical unit.

10. The apparatus according to claim 1, wherein the imaging optical unit comprises an objective, which is the only illumination objective.

11. The apparatus according to claim 1, wherein the imaging optical unit comprises an infinity objective and a tube lens.

12. The apparatus according to claim 1, wherein the imaging optical unit comprises a finite objective.

13. A method for the light-sheet-like illumination of a sample, in which:
   generating an illumination beam;
   focusing the illumination beam to form a light-sheet-like illumination light distribution with which a focal plane of the sample can be illuminated; and
   imaging, by an imaging optical unit, the light-sheet-like illumination light distribution into the focal plane of the sample; and
   splitting, by a polarization element arranged in a position conjugated to the focal plane, the illumination beam into two differently polarized sub-beams which propagate into the imaging optical unit in different propagation directions, wherein the light-sheet-like illumination light distribution is imaged by the imaging optical unit in the form of two differently polarized light-sheets which from a same side of the focal plane are superimposed on each other in the focal plane.

14. The method according to claim 13, wherein the method is used in a selective plane illumination microscopy (SPIM) microscope or in an oblique plane microscope.

* * * * *